(12) United States Patent
Zoll et al.

(10) Patent No.: US 9,027,025 B2
(45) Date of Patent: May 5, 2015

(54) REAL-TIME DATABASE EXCEPTION MONITORING TOOL USING INSTANCE EVICTION DATA

(75) Inventors: Michael Zoll, Redwood City, CA (US); Wilson Wai Shun Chan, San Mateo, CA (US); Angelo Pruscino, Los Altos, CA (US); Tak Fung Wang, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1233 days.

(21) Appl. No.: 11/736,132

(22) Filed: Apr. 17, 2007

(65) Prior Publication Data

US 2008/0263556 A1    Oct. 23, 2008

(51) Int. Cl.
*G06F 9/46*          (2006.01)
*G06F 11/34*         (2006.01)

(52) U.S. Cl.
CPC ........ *G06F 11/3409* (2013.01); *G06F 2201/81* (2013.01); *G06F 2201/86* (2013.01)

(58) Field of Classification Search
CPC combination set(s) only.
See application file for complete search history.

(56) References Cited

U.S. PATENT DOCUMENTS

| | | | |
|---|---|---|---|
| 4,318,182 A | 3/1982 | Bachman et al. |
| 5,113,522 A | 5/1992 | Dinwiddie et al. |
| 5,222,217 A | 6/1993 | Blount et al. |
| 5,283,856 A | 2/1994 | Gross et al. |
| 5,347,632 A | 9/1994 | Filepp et al. |
| 5,357,612 A | 10/1994 | Alaiwan |
| 5,465,328 A | 11/1995 | Dievendorff et al. |
| 5,627,764 A | 5/1997 | Schutzman et al. |
| 5,649,102 A | 7/1997 | Yamauchi et al. |
| 5,721,825 A | 2/1998 | Lawson et al. |
| 5,754,841 A | 5/1998 | Carino, Jr. |
| 5,774,668 A | 6/1998 | Choquier et al. |
| 5,790,807 A | 8/1998 | Fishler et al. |
| 5,802,253 A | 9/1998 | Gross et al. |
| 5,828,835 A | 10/1998 | Isfeld et al. |
| 5,852,818 A | 12/1998 | Guay et al. |
| 5,862,325 A | 1/1999 | Reed et al. |

(Continued)

OTHER PUBLICATIONS

Ravi Kokku et al., "Half-pipe Anchoring: An Efficient Technique for Multiple Connection Handoff," Proceedings 10th International Conference on Network Protocols, Nov. 12, 2002, XP010632563, 10 pages.

(Continued)

*Primary Examiner* — Eric C Wai
(74) *Attorney, Agent, or Firm* — Hickman Palermo Truong Becker Bingham Wong LLP; Daniel D. Ledesma (57) ABSTRACT

Techniques for monitoring resources of a computer system are provided. A monitoring process collects and reports utilization data for one or more resources of a computer system, such as CPU, memory, disk I/O, and network I/O. Instead of reporting just an average of the collected data over a period of time (e.g., 10 seconds), the monitoring process at least reports individually collected resource utilization values. If one or more of the utilization values exceed specified thresholds for the respective resources, then an alert may be generated. In one approach, the monitoring process is made a real-time priority process in the computer system to ensure that the memory used by the monitoring process is not swapped out of memory. Also, being a real-time priority process ensures that the monitoring process obtains a CPU in order collect resource utilization data even when the computer system is in a starvation mode.

29 Claims, 3 Drawing Sheets

(56) References Cited

U.S. PATENT DOCUMENTS

| | | |
|---|---|---|
| 5,867,665 A | 2/1999 | Butman et al. |
| 5,867,667 A | 2/1999 | Butman et al. |
| 5,870,562 A | 2/1999 | Butman et al. |
| 5,878,056 A | 3/1999 | Black et al. |
| 5,884,035 A | 3/1999 | Butman et al. |
| 5,890,167 A | 3/1999 | Bridge, Jr. et al. |
| 5,918,059 A | 6/1999 | Tavallaei et al. |
| 5,933,604 A | 8/1999 | Inakoshi |
| 5,940,839 A | 8/1999 | Chen et al. |
| 5,951,694 A | 9/1999 | Choquier et al. |
| 5,970,439 A * | 10/1999 | Levine et al. ............ 702/186 |
| 5,995,980 A | 11/1999 | Olson et al. |
| 5,999,931 A | 12/1999 | Breitbart et al. |
| 6,026,430 A | 2/2000 | Butman et al. |
| 6,029,205 A | 2/2000 | Alferness et al. |
| 6,035,379 A | 3/2000 | Raju et al. |
| 6,041,357 A | 3/2000 | Kunzelman et al. |
| 6,058,389 A | 5/2000 | Chandra et al. |
| 6,067,540 A | 5/2000 | Hyde |
| 6,073,129 A | 6/2000 | Levine et al. |
| 6,088,728 A | 7/2000 | Bellemore et al. |
| 6,178,529 B1 | 1/2001 | Short et al. |
| 6,182,086 B1 | 1/2001 | Lomet et al. |
| 6,185,555 B1 | 2/2001 | Sprenger et al. |
| 6,188,699 B1 | 2/2001 | Lang et al. |
| 6,192,378 B1 | 2/2001 | Abrams et al. |
| 6,222,840 B1 | 4/2001 | Walker et al. |
| 6,243,751 B1 | 6/2001 | Chatterjee et al. |
| 6,247,017 B1 | 6/2001 | Martin |
| 6,304,882 B1 | 10/2001 | Strellis et al. |
| 6,327,622 B1 | 12/2001 | Jindal et al. |
| 6,334,114 B1 | 12/2001 | Jacobs et al. |
| 6,338,074 B1 | 1/2002 | Poindexter et al. |
| 6,393,423 B1 | 5/2002 | Goedken |
| 6,427,146 B1 | 7/2002 | Chu |
| 6,442,568 B1 | 8/2002 | Velasco et al. |
| 6,466,950 B1 | 10/2002 | Ono |
| 6,473,794 B1 | 10/2002 | Guheen et al. |
| 6,490,574 B1 | 12/2002 | Bennett et al. |
| 6,493,826 B1 | 12/2002 | Schofield et al. |
| 6,515,968 B1 | 2/2003 | Combar et al. |
| 6,519,571 B1 | 2/2003 | Guheen et al. |
| 6,529,932 B1 | 3/2003 | Dadiomov et al. |
| 6,536,037 B1 | 3/2003 | Guheen et al. |
| 6,539,381 B1 | 3/2003 | Prasad et al. |
| 6,556,659 B1 | 4/2003 | Bowman-Amuah |
| 6,560,592 B1 | 5/2003 | Reid et al. |
| 6,587,866 B1 | 7/2003 | Modi et al. |
| 6,601,083 B1 | 7/2003 | Reznak |
| 6,601,101 B1 | 7/2003 | Lee et al. |
| 6,621,083 B2 | 9/2003 | Cole |
| 6,651,012 B1 | 11/2003 | Bechhoefer |
| 6,654,907 B2 | 11/2003 | Stanfill et al. |
| 6,658,596 B1 | 12/2003 | Owen |
| 6,691,155 B2 | 2/2004 | Gottfried |
| 6,697,791 B2 | 2/2004 | Hellerstein et al. |
| 6,704,831 B1 | 3/2004 | Avery |
| 6,704,886 B1 | 3/2004 | Gill et al. |
| 6,728,748 B1 | 4/2004 | Mangipudi et al. |
| 6,757,710 B2 | 6/2004 | Reed |
| 6,769,074 B2 | 7/2004 | Vaitzblit |
| 6,793,625 B2 * | 9/2004 | Cavallaro et al. ............ 600/440 |
| 6,802,003 B1 | 10/2004 | Gross et al. |
| 6,816,907 B1 | 11/2004 | Mei et al. |
| 6,826,182 B1 | 11/2004 | Parthasarathy |
| 6,826,579 B1 | 11/2004 | Leymann et al. |
| 6,850,893 B2 | 2/2005 | Lipkin et al. |
| 6,868,413 B1 | 3/2005 | Grindrod et al. |
| 6,882,994 B2 | 4/2005 | Yoshimura et al. |
| 6,889,231 B1 | 5/2005 | Souder et al. |
| 6,917,946 B2 | 7/2005 | Corl, Jr. et al. |
| 6,925,476 B1 | 8/2005 | Multer et al. |
| 6,980,988 B1 | 12/2005 | Demers et al. |
| 7,003,531 B2 | 2/2006 | Holenstein et al. |
| 7,031,974 B1 | 4/2006 | Subramaniam |
| 7,058,957 B1 | 6/2006 | Nguyen |
| 7,065,537 B2 | 6/2006 | Cha et al. |
| 7,080,382 B2 | 7/2006 | Sexton et al. |
| 7,089,228 B2 | 8/2006 | Arnold et al. |
| 7,095,871 B2 | 8/2006 | Jones et al. |
| 7,149,738 B2 | 12/2006 | Kumar et al. |
| 7,174,379 B2 | 2/2007 | Agarwal et al. |
| 7,177,866 B2 | 2/2007 | Holenstein et al. |
| 7,178,050 B2 | 2/2007 | Fung et al. |
| 7,243,256 B2 | 7/2007 | Kaiya et al. |
| 7,263,590 B1 | 8/2007 | Todd et al. |
| 7,269,157 B2 | 9/2007 | Klinker et al. |
| 7,398,471 B1 * | 7/2008 | Rambacher et al. ............ 715/744 |
| 7,424,396 B2 | 9/2008 | Dodeja et al. |
| 7,506,215 B1 | 3/2009 | Maw et al. |
| 7,617,257 B2 * | 11/2009 | Sathyanarayan et al. ............ 1/1 |
| 8,117,505 B2 * | 2/2012 | Sridharan et al. ............ 714/47.2 |
| 8,555,274 B1 | 10/2013 | Chawla et al. |
| 2001/0032137 A1 | 10/2001 | Bennett et al. |
| 2001/0047270 A1 | 11/2001 | Gusick et al. |
| 2001/0052137 A1 | 12/2001 | Klein |
| 2001/0056493 A1 | 12/2001 | Mineo |
| 2002/0049845 A1 | 4/2002 | Sreenivasan et al. |
| 2002/0052885 A1 | 5/2002 | Levy |
| 2002/0073019 A1 | 6/2002 | Deaton |
| 2002/0073139 A1 | 6/2002 | Hawkins et al. |
| 2002/0091685 A1 | 7/2002 | Feldman et al. |
| 2002/0112008 A1 | 8/2002 | Christenson et al. |
| 2002/0116457 A1 | 8/2002 | Eshleman et al. |
| 2002/0129157 A1 | 9/2002 | Varsano |
| 2002/0133507 A1 | 9/2002 | Holenstein et al. |
| 2002/0138582 A1 | 9/2002 | Chandra et al. |
| 2002/0144010 A1 | 10/2002 | Younis et al. |
| 2002/0161896 A1 | 10/2002 | Wen et al. |
| 2002/0194015 A1 | 12/2002 | Gordon et al. |
| 2002/0194081 A1 | 12/2002 | Perkowski |
| 2003/0005028 A1 | 1/2003 | Dritschler et al. |
| 2003/0007497 A1 | 1/2003 | March et al. |
| 2003/0014523 A1 | 1/2003 | Teloh et al. |
| 2003/0037029 A1 | 2/2003 | Holenstein et al. |
| 2003/0037146 A1 | 2/2003 | O'Neill |
| 2003/0039212 A1 | 2/2003 | Lloyd et al. |
| 2003/0046421 A1 | 3/2003 | Horvitz et al. |
| 2003/0088671 A1 | 5/2003 | Klinker et al. |
| 2003/0108052 A1 | 6/2003 | Inoue et al. |
| 2003/0110085 A1 | 6/2003 | Murren et al. |
| 2003/0135523 A1 | 7/2003 | Brodersen et al. |
| 2003/0135609 A1 | 7/2003 | Carlson et al. |
| 2003/0161468 A1 | 8/2003 | Iwagaki et al. |
| 2003/0177187 A1 | 9/2003 | Levine et al. |
| 2003/0208523 A1 | 11/2003 | Gopalan et al. |
| 2003/0212657 A1 | 11/2003 | Kaluskar et al. |
| 2003/0212670 A1 | 11/2003 | Yalamanchi et al. |
| 2003/0229804 A1 | 12/2003 | Srivastava et al. |
| 2003/0236834 A1 | 12/2003 | Gottfried |
| 2004/0024771 A1 | 2/2004 | Jain et al. |
| 2004/0024774 A1 | 2/2004 | Jain et al. |
| 2004/0024794 A1 | 2/2004 | Jain et al. |
| 2004/0024979 A1 | 2/2004 | Kaminsky et al. |
| 2004/0034640 A1 | 2/2004 | Jain et al. |
| 2004/0034664 A1 | 2/2004 | Jain et al. |
| 2004/0064548 A1 | 4/2004 | Adams et al. |
| 2004/0093512 A1 * | 5/2004 | Sample ............ 713/201 |
| 2004/0103195 A1 | 5/2004 | Chalasani et al. |
| 2004/0107125 A1 | 6/2004 | Guheen et al. |
| 2004/0111506 A1 | 6/2004 | Kundu et al. |
| 2004/0117794 A1 | 6/2004 | Kundu |
| 2004/0133591 A1 | 7/2004 | Holenstein et al. |
| 2004/0176996 A1 | 9/2004 | Powers et al. |
| 2004/0181476 A1 * | 9/2004 | Smith et al. ............ 705/35 |
| 2004/0236860 A1 | 11/2004 | Logston et al. |
| 2004/0268357 A1 | 12/2004 | Joy et al. |
| 2005/0010545 A1 | 1/2005 | Joseph |
| 2005/0021567 A1 | 1/2005 | Holenstein et al. |
| 2005/0021771 A1 | 1/2005 | Kaehn et al. |
| 2005/0033809 A1 | 2/2005 | McCarthy et al. |
| 2005/0125371 A1 | 6/2005 | Bhide et al. |
| 2005/0165925 A1 | 7/2005 | Dan et al. |
| 2005/0183072 A1 | 8/2005 | Horning et al. |

(56) References Cited

U.S. PATENT DOCUMENTS

| | | |
|---|---|---|
| 2005/0193024 A1 | 9/2005 | Beyer et al. |
| 2005/0239476 A1 | 10/2005 | Betrabet et al. |
| 2005/0240649 A1 | 10/2005 | Elkington et al. |
| 2005/0262205 A1 | 11/2005 | Nikolov et al. |
| 2005/0267965 A1 | 12/2005 | Heller |
| 2006/0036617 A1 | 2/2006 | Bastawala et al. |
| 2006/0112135 A1 | 5/2006 | Warshawsky |
| 2007/0100793 A1 | 5/2007 | Brown et al. |
| 2007/0162260 A1 | 7/2007 | Nordstrom |
| 2007/0226323 A1 | 9/2007 | Halpern |
| 2009/0112809 A1 | 4/2009 | Wolff et al. |
| 2009/0239480 A1 | 9/2009 | Rofougaran et al. |
| 2010/0145929 A1 | 6/2010 | Burger et al. |
| 2012/0072780 A1 | 3/2012 | Kini et al. |
| 2012/0221732 A1 | 8/2012 | Waldspurger |
| 2012/0271594 A1 | 10/2012 | Yan et al. |

OTHER PUBLICATIONS

Ying-Dar Lin et al., "Direct Web Switch Routing with State Migration, TCP Masquerade, and Cookie Name Rewriting," Globecom 2003, IEEE Global Telecommunications Conference, Dec. 12003, IEEE, CP010677300, pp. 3663-3667.

Chase, Jeffrey S., et al., "Dynamic Virtual Clusters in a Grid Site Manager," Proceedings of the 12$^{th}$ IEEE International Symposium on High Performance Distributed Computing, 2003, XP-010643715, 12 pgs.

Shiva, S.G., et al., "Modular Description/Simulation/Synthesis Using DDL," 19$^{th}$ Design Automation Conference 1982, IEEE Press, pp. 321-329.

Skow, Eric, et al., "A Security Architecture for Application Session Handoff," 2002, IEEE International Conference Proceedings, Apr. 28-May 2, 2002, vol. 1 of 5, pp. 2058-2063, XP010589848.

Song, Henry, et al., "Browser State Repository Service," Lecture Notes in Computer Science, vol. 2414, 2002, pp. 1-14, XP002904339.

Spiegler, Israel, "Automating Database Construction," ACM SIGMIS Database, vol. 14, Issue 3, Spring 1983, pp. 21-29.

Kei Kurakawa et al., "Life Cycle Design Support Based on Environmental Information Sharing," IEEE, Feb. 1-3, 1999, Proceedings EcoDesign '99, First International Symposium, pp. 138-142.

Gunther, Oliver et al., "MMM: A Web-Based System for Sharing Statistical Computing Modules," IEEE, May-Jun. 1997, vol. 1, Issue 3, pp. 59-68.

"Automatic Performance Diagnostics" downloaded Apr. 17, 2007 from the Internet <http://oracle-docs.dartmouth.edu/dba-docs/10gdoc/server.101/b10752/diagnsis.htm> 9 pages.

* cited by examiner

REAL-TIME DATABASE EXCEPTION MONITORING TOOL USING INSTANCE EVICTION DATA

FIELD OF THE INVENTION

The present invention relates to monitoring resources of a computer system.

BACKGROUND

A computer system manages access to multiple resources of the system, such as a CPU, memory, a storage device (referred to hereinafter as a disk), and a network. There are many computer monitoring tools available that monitor such resources. Monitoring tools gather information about the availability (or lack thereof) of resources and typically report such information to users or administrators. However, existing monitoring tools suffer from significant drawbacks. One of those drawbacks is described in the context of Oracle Corporation's Real Application Cluster ("RAC").

A RAC comprises a single database that is shared by multiple instances of a database server (referred to as database instances). In such a configuration, each separate database instance reads data from and writes data to the same disk space, but each database instance maintains its own separate shared memory, which is only available to the processes of the corresponding database instance.

Currently, a RAC database instance may be evicted from a cluster because the database instance is not responding to other databases instances in the cluster either through network messaging or disk I/O. A possible reason for why this may happen is that the evicted instance has a relatively high CPU usage level. If CPU usage is relatively high, then a monitoring tool is unable to obtain the CPU in order to determine that the disk and network are not responding to other instances in the cluster. After the database instance is evicted from the cluster, there is not enough information about the machine on which the evicted instance is running because current monitoring tools (either inside or outside the database) are unable to capture the data during the period that the CPU is maxed out (e.g., 99% usage). Eviction of a database instance may also occur when other resources of the corresponding machine are heavily utilized or unresponsive, such as disk I/O, network I/O, and memory. Without the necessary information, an administrator of the cluster is unable to quickly and accurately determine why the database instance was evicted.

Based on the foregoing, there is a need to provide a computer system monitoring tool that will report exceptional events before resources of the computer system become unavailable or unresponsive. The monitoring tool should also provide an accurate description of the state of the computer system so that an analysis of the gathered statistics will yield the reason(s) why the computer system failed or became (at least temporarily) unresponsive.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. For example, although embodiments of the invention are described in the context of a database cluster, other contexts also apply, such as grid computing, a single node database system, or a desktop computer. In other instances, well-known structures and devices are shown in block diagram form in order to avoid unnecessarily obscuring the present invention.

General Overview

Techniques for monitoring the resources of a computer system are provided. In one approach, a monitoring tool comprises a monitoring process that is given a real-time priority in the computer system. This enables the monitoring process to gather utilization data of one or more resources even when the CPU usage is relatively high and the monitoring process would have otherwise been replaced by a system process or user process with higher priority.

A monitoring process collects (or samples) data at regular intervals. In a related approach, instead of reporting average values of a particular set of collected data, the monitoring tool reports exceptional events, such as when one or more collected values exceeds a particular threshold for a resource. Exceptional events may be reported directly to a user of the computer system and/or to other processes associated with the monitoring process that may make predictions and take subsequent actions to prevent a decrease in performance of the computer system.

Although reference is made to a single monitoring process, "a monitoring process" may include multiple monitoring processes. For example, there may be a separate monitoring process designated for collecting utilization data for each resource. Therefore, there may be a first monitoring process for collecting utilization data for disk I/O, a second monitoring process for collecting utilization data for memory, a third monitoring process for collecting utilization data for a CPU, and a fourth monitoring process for collecting utilization data for network I/O.

As used hereinafter, "utilization data" is one or more values indicating the utilization, availability, and/or responsiveness of a resource. Unless otherwise specified, reference to "utilization" may also include availability and/or responsiveness. "Utilization value" refers to a single value (of the utilization data) that represents the utilization of a resource at a particular instant. An "instant" is a point in time when the monitoring process collects a utilization value.

Types of Resources

There are many resources of a computer system that may be monitored by a monitoring tool. Examples of resources include, but are not limited to, CPU, memory, disk I/O, and network I/O.

Although memory is referred to as a single resource, memory may be divided into multiple memory areas and each memory area may be treated as a separate resource. For example, the memory of a computer system may comprise a private memory area and a shared memory area. Each memory area may be further divided into multiple memory areas. In an embodiment of the invention, one or more monitoring processes may treat each of the different memory areas as a separate resource by collecting utilization data for each of the different memory areas.

Also, although network I/O appears to refer to a single resource, network I/O may refer to multiple resources that are each treated separately. For example, a separate queue may be maintained for each node in a network to which the computer system is connected.

Measuring Resource Utilization

Utilization data may be gathered every second, or at other intervals. Embodiments of the invention are not limited to any particular way of determining or measuring resource utilization and/or availability. The utilization and/or availability of a resource may be measured in multiple ways. For example, CPU usage may be measured by determining the length of a run queue. Each element in a run queue indicates a process that is waiting for the CPU.

As another example, disk I/O may be measured by determining the length of a disk queue. Each element in a disk queue indicates a read or write request to a file system or a database associated with the computer system.

As another example, network I/O may be measured by determining the response time of a ping to a node in the network. Additionally or alternatively, a queue may be maintained by the computer system for each node in the network. Network I/O may then be measured by determining the length of the queue. Each element in a network node queue indicates a pending (e.g., unanswered) request for data or services from the corresponding node in the network.

Additionally or alternatively, for each queue discussed above, resource utilization may be measured by how long an element (e.g., the oldest element) in the queue has been waiting for the corresponding resource. Such a measurement indicates responsiveness but may also be used as a measurement of resource utilization. Responsiveness of a resource may indicate that the resource is heavily utilized or that the resource has failed and is unable to support any requests for the resource.

Reporting Exceptional Data

According to an embodiment of the invention, rather then reporting only an average of the collected utilization data, "exceptional events" are reported (either in addition to the average or as an alternative thereto). In an embodiment, an "exceptional event" occurs when the utilization of a particular resource exceeds a threshold for that resource at a particular instant.

In a related embodiment, an exceptional event may occur when utilization of a particular resource exceeds a threshold for that resource at multiple instants over a period of time. For example, an exceptional event may be CPU usage of 98% or above for 8 out of 10 consecutive instants.

Figure 1:
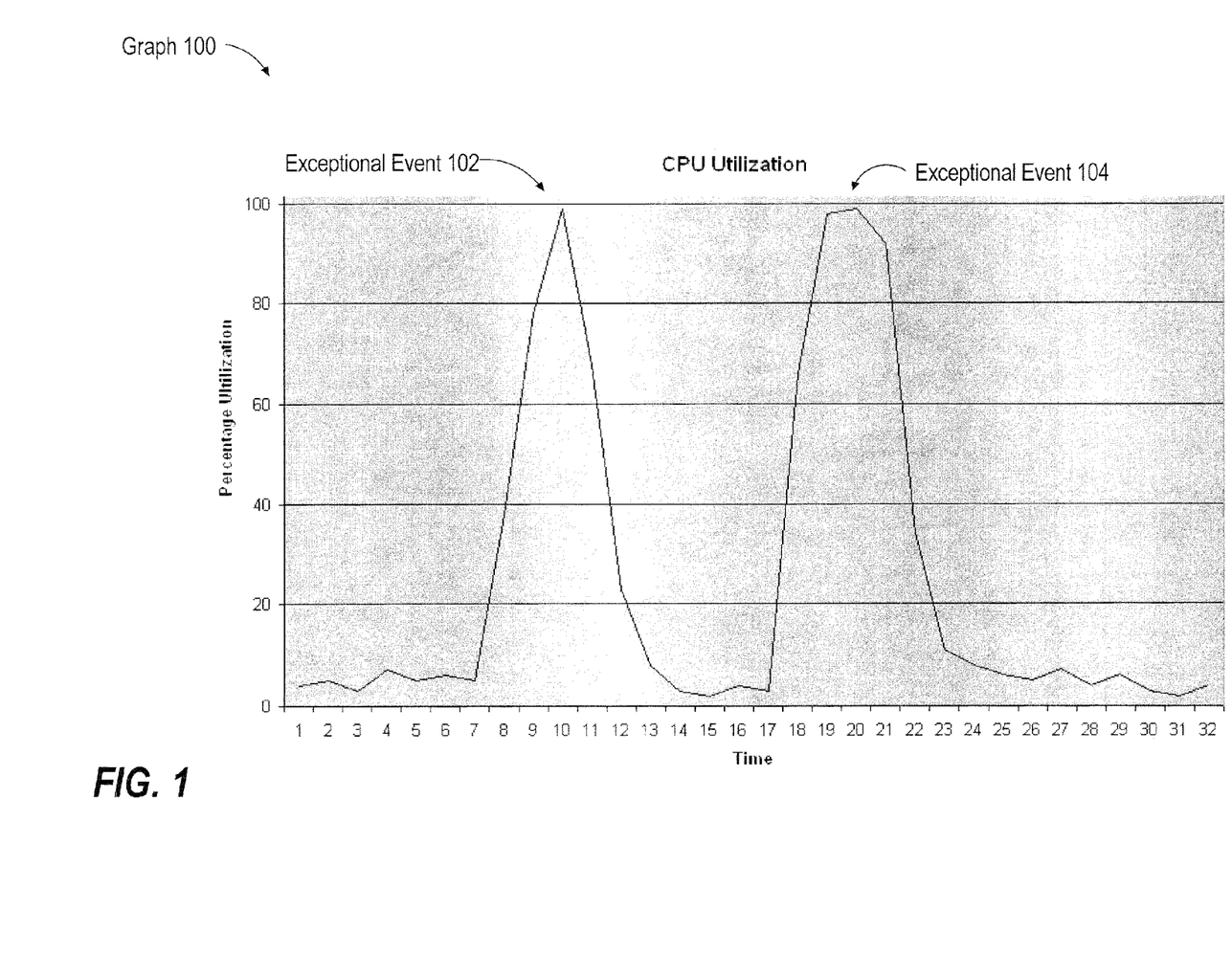
FIG. 1 is a graph that illustrates exceptional events with respect to a resource in a computer system, according to an embodiment of the invention.

FIG. 1 is a graph 100 that illustrates exceptional events with respect to a resource in a computer system, according to an embodiment of the invention. Specifically, graph 100 illustrates utilization levels of a CPU in the computer system. An exceptional event 102 occurs at time instant 10 (where utilization is 98%) and an exceptional event 104 occurs at time instants 19 and 20 (where utilization is 98% and 99%, respectively). The interval between each time instant may be, e.g., one second or one millisecond.

In an embodiment, if an exceptional event occurs, then an alert is issued to warn of the severity and possible impact of the exceptional event. The alert may trigger an automatic response by another process associated with the monitoring process. For example, if CPU usage exceeds 98%, then another process denies requests for system resources from other nodes in the network to which the computer system is connected. Additionally or alternatively, the alert may issue immediately to an administrator or user so that the administrator or user may take steps (as they deem appropriate) to prevent significant negative effects (that may result from the high resource utilization) from occurring.

A threshold value may be specified in many ways and based on different factors. For example, a threshold value for CPU usage may be specified by a user or administrator of the computer system. Alternatively or additionally, the threshold value may be a default value that is set by the monitoring tool.

A threshold value may be based on the median utilization value of a particular resource over a period of time. Alternatively, a threshold value may be based on a number of standard deviations away from the average utilization value of the particular resource over a period of time.

Real-Time Priority Monitoring Process

According to an embodiment of the invention, a monitoring process is made to have a real-time priority in the computer system. More than one process that is executing in the computer system may have a real-time priority. A "real-time priority process" is a process that obtains the CPU whenever the process requests the CPU. Also, the memory used by a real-time priority process is pinned in memory so that the memory is never swapped or paged out. As a real-time priority process, it is guaranteed that the monitoring process will be scheduled and will obtain the CPU at its scheduled intervals in order to collect utilization data and store the utilization data for further analysis. Thus, the monitoring process may operate under many starvation situations. For example, if CPU usage is 99%, then, rather than being denied access to the CPU, the monitoring process obtains access to the CPU when the monitoring process is scheduled. The monitoring process is lightweight so that it uses a relatively small amount of memory and requires relatively few CPU cycles to collect a utilization value.

Analysis of Utilization Data

In an embodiment, utilization data that is collected is sent to a logging system. The logging system includes an interpretive engine that attempts root cause analysis and suggests appropriate actions, such as calling a workload manager or connection tool to throttle incoming requests. Thus, the logging system provides a type of feedback control.

The interpretive engine may also comprise a historical perspective and a predictor of the probability of certain events which may destabilize the computer system (and/or an associated RAC cluster), result in hangs, or cause other severe performance issues. For example, if an increase in the length of the disk queue by a factor of 10 in a few seconds tends to precede a database instance being evicted, then an alert is generated when that increase occurs and requests for access to the disk are throttled.

Flow Diagram

Figure 2:
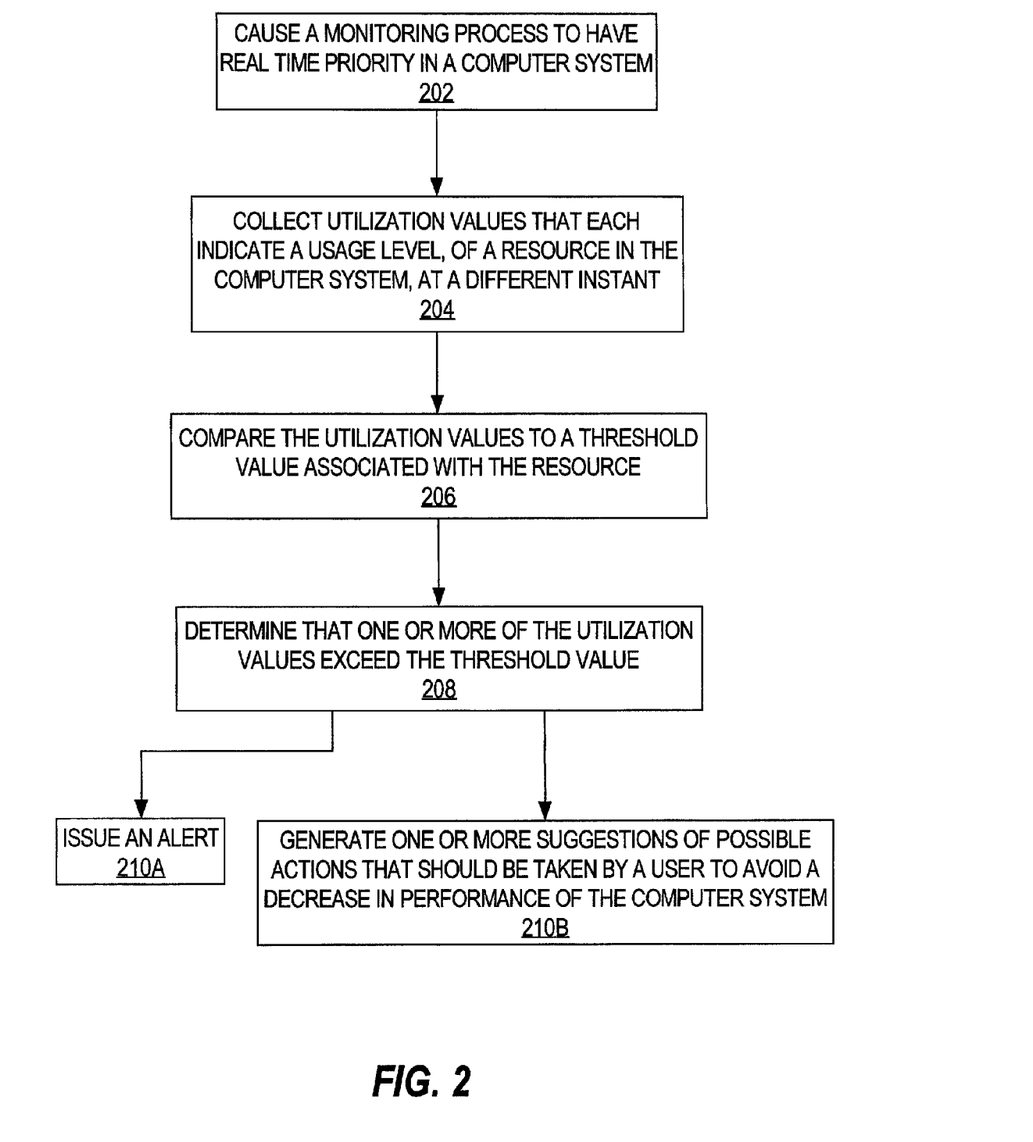
FIG. 2 is a flow diagram that illustrates how a resource in a computer system may be monitored, according to an embodiment of the invention.

FIG. 2 is a flow diagram that illustrates how a resource in a computer system may be monitored, according to an embodiment of the invention. At step 202, a monitoring process is made to have real-time priority in the computer system. At step 204, the monitoring process collects utilization values that each indicates a utilization or responsiveness level, of the resource, at a different instant. At step 206, the utilization values are compared to a threshold value that is associated with the resource. At step 208, it is determined, either by the monitoring process or by another process, that one or more utilization values exceed the threshold value. After step 208, one or more of the following actions may be performed. For example, at step 210A, an alert is issued, either to a user (e.g., administrator) of the computer system or to another process associated with the monitoring process that collects the utilization values. The other process may perform some actions in response to the alert, such as denying all or a subset of subsequent requests to the resource. As another example, at step 210B, one or more suggestions are generated for a user (e.g., administrator). The suggestions are of possible actions that the user should take to avoid a decrease in the performance of the computer system. Examples of suggestions may be to restart the computer system and to deny incoming requests for system resources from all or certain nodes in the network.

Contrast with Current Monitoring Tools

Current monitoring tools only collect average data over a period of time (e.g., every 5-10 seconds or more). Current monitoring tools are not concerned with exceptional events, i.e., outliers. If they were concerned with exceptional events, then those exceptional events are difficult to capture when only statistical averages are reported. Averaging data effectively removes outliers. To illustrate, consider FIG. 1 above. If a traditional monitoring tool collected the utilization data illustrated in graph 100 and reported the average of five consecutive data values, then the traditional monitoring tool would report at least six values:

- 4.8, which represents the average of the data collected at times 1-5;
- 45.2, which represents the average of the data collected at times 6-10;
- 20.8, which represents the average of the data collected at times 11-15;
- 54, which represents the average of the data collected at times 16-20;
- 30.2, which represents the average of the data collected at times 21-25; and
- 5, which represents the average of the data collected at times 26-30.

Therefore, the outliers (i.e., at time instants 10, 19, and 20) are removed when the collected values are averaged. Based on the average values, the traditional monitoring tool would not initiate any types alerts.

Thus, one of the significant differences that distinguish embodiments of the invention from other monitoring tools is the statistical perspective. Embodiments of the invention allow a monitoring tool to identify and report exceptional events while current monitoring tools only calculate and report statistical averages.

Furthermore, because current monitoring tools do not have real-time priority, it is difficult, if not impossible, for current monitoring tools to collect exceptional events when CPU usage is relatively high or memory is unavailable for the monitoring tool. As a result, a gap arises in the collected data. It is thus difficult to determine why, e.g., a database instance is evicted from a cluster. Data indicating one or more exceptional events is always missing during a memory or CPU starvation time period because the monitoring process that performs the collection is unable to obtain the necessary resource(s) in order to collect utilization data for any resources.

One reason why embodiments of the invention are not intuitive is because it is common practice for database designers and skilled software developers to avoid causing non-essential processes to have real-time priorities in a computer system. Many designers and developers consider monitoring processes as non-essential processes, which is why, traditionally, monitoring processes have been made a relatively low priority.

Hardware Overview

Figure 3:
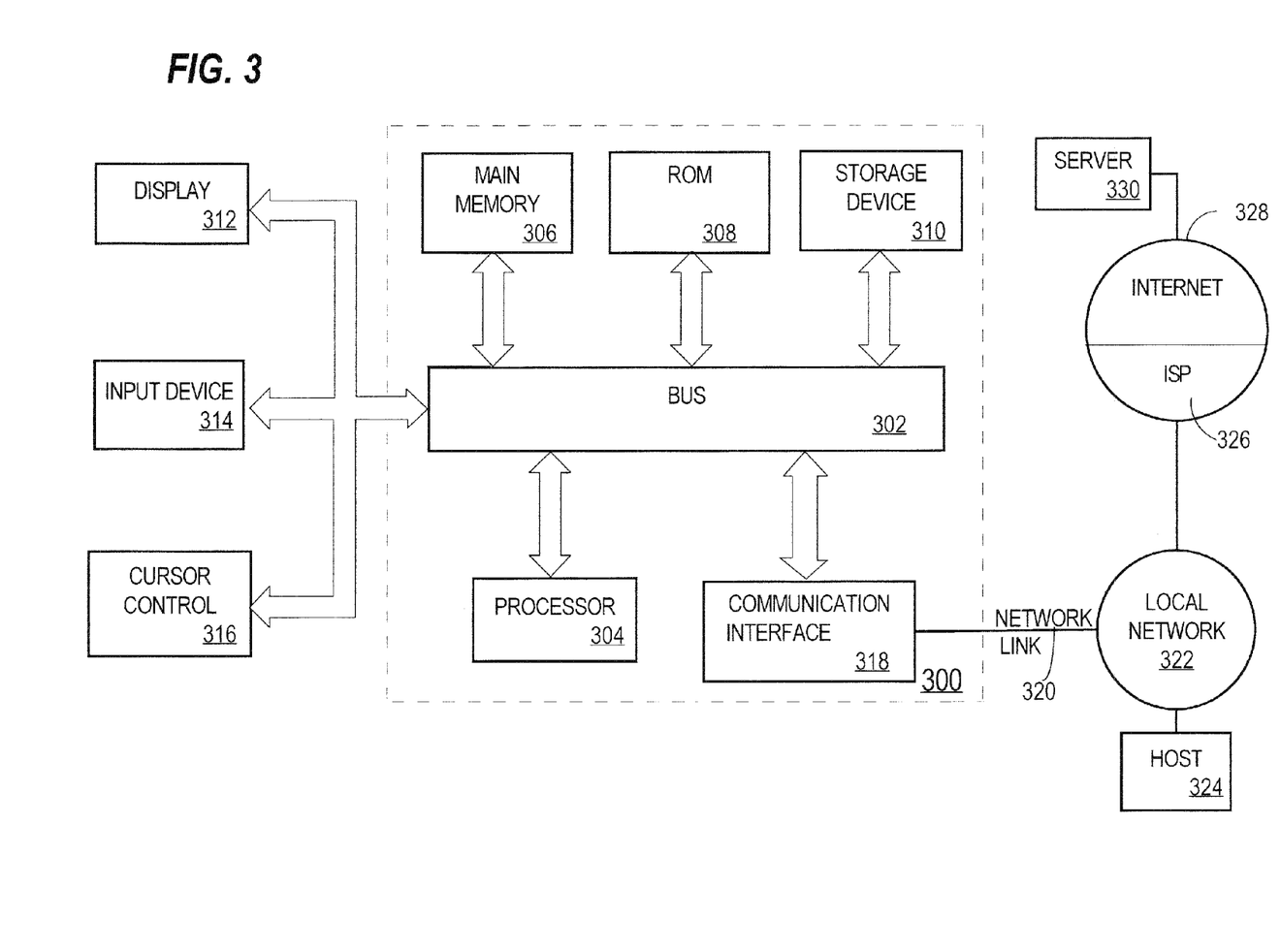
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for monitoring a particular node of a first cluster database system that comprises a database, a database server that executes on a plurality of nodes that includes the particular node, wherein each node of the plurality of nodes executes one or more database instances, wherein the database of the first cluster database system is shared by multiple database instances of the database server, the method comprising:

establishing, on the particular node of the plurality of nodes of the first cluster database system, a monitoring process;

the monitoring process collecting a plurality of values, wherein each value of the plurality of values indicates a measure of utilization or responsiveness of a first resource of the particular node at a different instant;

determining that a database instance that was executing on a node of a second cluster database system was evicted from the second cluster database system;

in response to determining that the database instance was evicted from the second cluster database system, storing eviction data that indicates a measure of utilization or responsiveness of a second resource of the node of the second cluster database system;

wherein the eviction data reflects the utilization or responsiveness that the second resource was experiencing when the database instance was evicted from the second cluster database system;

determining, based on (a) one or more values of the plurality of values and (b) the eviction data, a probability that the utilization or responsiveness of the first resource indicated by the one or more values will lead to performance problems for the particular node; and based on the probability, performing one or more specified actions;

wherein the method is performed by one or more computing devices.

2. The method of claim 1, wherein a memory used by the monitoring process is never swapped out of memory while the particular node is operating.

3. The method of claim 1, wherein the monitoring process obtains a CPU of the particular node whenever the monitoring process requests the CPU.

4. The method of claim 1, wherein performing one or more specified actions includes issuing an alert to a user of the first cluster database system.

5. The method of claim 1, wherein:
the particular node is connected to a network; and
performing one or more specified actions includes denying one or more requests from other nodes in the network for one or more resources of the particular node.

6. The method of claim 1, wherein performing one or more specified actions includes issuing an alert to one or more other processes, of the first cluster database system, that perform one or more other actions in response to the alert.

7. The method of claim 1, wherein performing one or more specified actions includes generating one or more suggestions of possible actions that should be taken by a user of the first cluster database system to avoid a decrease in performance of the particular node.

8. The method of claim 1, wherein the first resource is one of a CPU, a memory, a network queue, or a disk queue.

9. The method of claim 1, further comprising, for each resource of one or more additional resources, in the particular node, that are different than the first resource:
the monitoring process collecting a second plurality of values, wherein each value of the second plurality of values indicate a measure of utilization or responsiveness of said each resource at a different instant, wherein a different threshold value is associated with said each resource; and
determining based on (c) one or more second plurality of values and (d) the eviction data, a second probability that the utilization or responsiveness of said each resource will lead to performance problems for the particular node;
based on the second probability, performing the one or more specified actions.

10. The method of claim 1, wherein:
determining comprises comparing the one or more of the plurality of values with one or more second values indicated in historical data;
the one or more second values were collected by a second monitoring process prior to the database instance of the node of the second cluster database system experiencing one or more performance problems;
the one or more second values are associated with the one or more performance problems.

11. The method of claim 1, wherein the first resource is a first memory area that is different than a second memory area of the particular node, the method further comprising:
the monitoring process collecting a second plurality of values, wherein each value of the second plurality of values indicates a measure of utilization or responsiveness of the second memory area of the particular node at a different instant.

12. The method of claim 11, wherein the first memory area is a private memory area of the particular node and the second memory area is a shared memory area of the particular node.

13. The method of claim 1, wherein the second cluster database system is the first cluster database system.

14. The method of claim 1, wherein the monitoring process is a real-time priority process.

15. One or more non-transitory machine-readable storage media storing instructions for monitoring a particular node of a first cluster database system that comprises a database, a database server that executes on a plurality of nodes that includes the particular node, wherein each node of the plurality of nodes executes one or more database instances, wherein the database of the first cluster database system is shared by multiple database instances of the database server, wherein the instructions, when executed by one or more processors, cause:
establishing, on the particular node of the plurality of nodes of the first cluster database system, a monitoring process;
the monitoring process collecting a plurality of values, wherein each value of the plurality of values indicates a measure of utilization or responsiveness of a first resource of the particular node at a different instant;
determining that a database instance that was executing on a node of a second cluster database system was evicted from the second cluster database system;
in response to determining that the database instance was evicted from the second cluster database system, storing eviction data that indicates a measure of utilization or responsiveness of a second resource of the node of the second cluster database system;
wherein the eviction data reflects the utilization or responsiveness that the second resource was experiencing when the database instance was evicted from the second cluster database system;
determining, based on (a) one or more values of the plurality of values and (b) the eviction data, a probability that the utilization or responsiveness of the first resource indicated by the one or more values will lead to performance problems for the particular node; and
based on the probability, performing one or more specified actions.

16. The one or more non-transitory machine-readable storage media of claim 15, wherein a memory used by the monitoring process is never swapped out of memory while the particular node is operating.

17. The one or more non-transitory machine-readable storage media of claim 15, wherein the monitoring process obtains a CPU of the particular node whenever the monitoring process requests the CPU.

18. The one or more non-transitory machine-readable storage media of claim 15, wherein performing one or more specified actions includes issuing an alert to a user of the first cluster database system.

19. The one or more non-transitory machine-readable storage media of claim 15, wherein:
the particular node is connected to a network; and
performing one or more specified actions includes denying one or more requests from other nodes in the network for one or more resources of the particular node.

20. The one or more non-transitory machine-readable storage media of claim 15, wherein performing one or more specified actions includes issuing an alert to one or more other processes, of the first cluster database system, that perform one or more other actions in response to the alert.

21. The one or more non-transitory machine-readable storage media of claim 15, wherein performing one or more specified actions includes generating one or more suggestions of possible actions that should be taken by a user of the first cluster database system to avoid a decrease in performance of the particular node.

22. The one or more non-transitory machine-readable storage media of claim 15, wherein the first resource is one of a CPU, a memory, a network queue, or a disk queue.

23. The one or more non-transitory machine-readable storage media of claim 15, wherein the plurality of nodes collectively manage a single database.

24. The one or more non-transitory machine-readable storage media of claim 15, wherein the instructions, when executed by the one or more processors, further cause, for each resource of one or more additional resources, in the particular node, that are different than the first resource:

the monitoring process collecting a second plurality of values, wherein each value of the second plurality of values indicate a measure of utilization or responsiveness of said each resource at a different instant, wherein a different threshold value is associated with said each resource; and determining based on (c) one or more second plurality of values and (d) the eviction data, a second probability that the utilization or responsiveness of said each resource will lead to performance problems for the particular node;

based on the second probability, performing one or more specified actions.

25. The one or more non-transitory machine-readable storage media of claim 15, wherein:

determining comprises comparing the one or more of the plurality of values with one or more second values indicated in historical data;

the one or more second values were collected by a second monitoring process prior to the database instance of the node of the second cluster database system experiencing one or more performance problems;

the one or more second values are associated with the one or more performance problems.

26. The one or more non-transitory machine-readable storage media of claim 15, wherein the first resource is a first memory area that is different than a second memory area of the particular node, wherein the instructions, when executed by the one or more processors, further cause:

the monitoring process collecting a second plurality of values, wherein each value of the second plurality of values indicates a measure of utilization or responsiveness of the second memory area of the particular node at a different instant.

27. The one or more non-transitory machine-readable storage media of claim 26, wherein the first memory area is a private memory area of the particular node and the second memory area is a shared memory area of the particular node.

28. The one or more non-transitory machine-readable storage media of claim 15, wherein the second cluster database system is the first cluster database system.

29. The one or more non-transitory machine-readable storage media of claim 15, wherein the monitoring process is a real-time priority process.

* * * * *

UNITED STATES PATENT AND TRADEMARK OFFICE
CERTIFICATE OF CORRECTION

PATENT NO. : 9,027,025 B2
APPLICATION NO. : 11/736132
DATED : May 5, 2015
INVENTOR(S) : Zoll et al.

Page 1 of 1

It is certified that error appears in the above-identified patent and that said Letters Patent is hereby corrected as shown below:

Title page

On first page, column 1, under Abstract, line 14, delete "order" and insert -- order to --, therefor.

Specification

In column 3, line 51, delete "rather then" and insert -- rather than --, therefor.

Signed and Sealed this
Ninth Day of February, 2016

Michelle K. Lee
*Director of the United States Patent and Trademark Office*